United States Patent
Uhlig

[11] 4,056,312
[45] Nov. 1, 1977

[54] FILM TITLE MACHINE FOR AMATEUR FILMMAKERS

[76] Inventor: Werner Uhlig, Junkeracker 31, D-7540 Neuenburg, Germany

[21] Appl. No.: 674,396

[22] Filed: Apr. 7, 1976

[30] Foreign Application Priority Data

Apr. 12, 1975 Germany .............................. 2516080

[51] Int. Cl.² .............................................. G03B 21/32
[52] U.S. Cl. ......................................... 352/90; 352/55
[58] Field of Search ....................... 352/50, 51, 52, 55, 352/87, 90

[56] References Cited

U.S. PATENT DOCUMENTS

| | | | |
|---|---|---|---|
| 1,243,507 | 10/1917 | Germain | 352/90 |
| 1,763,231 | 6/1930 | Fritts | 352/90 |
| 1,885,555 | 11/1932 | Schwartz | 352/90 |
| 2,196,423 | 4/1940 | Musaphia | 352/52 |
| 2,374,371 | 4/1945 | Morch | 352/87 |
| 2,859,656 | 11/1958 | Lemieux | 352/90 |
| 3,836,240 | 9/1974 | Henderson | 352/87 |

FOREIGN PATENT DOCUMENTS

| | | | |
|---|---|---|---|
| 1,046,926 | 12/1953 | France | 352/87 |

*Primary Examiner*—Monroe H. Hayes

[57] ABSTRACT

A machine for preparing titles for motion picture films, and having a continuous belt driven by two parallel shaft rollers and transparent plates for the mounting of objects to be photographed.

8 Claims, 1 Drawing Figure

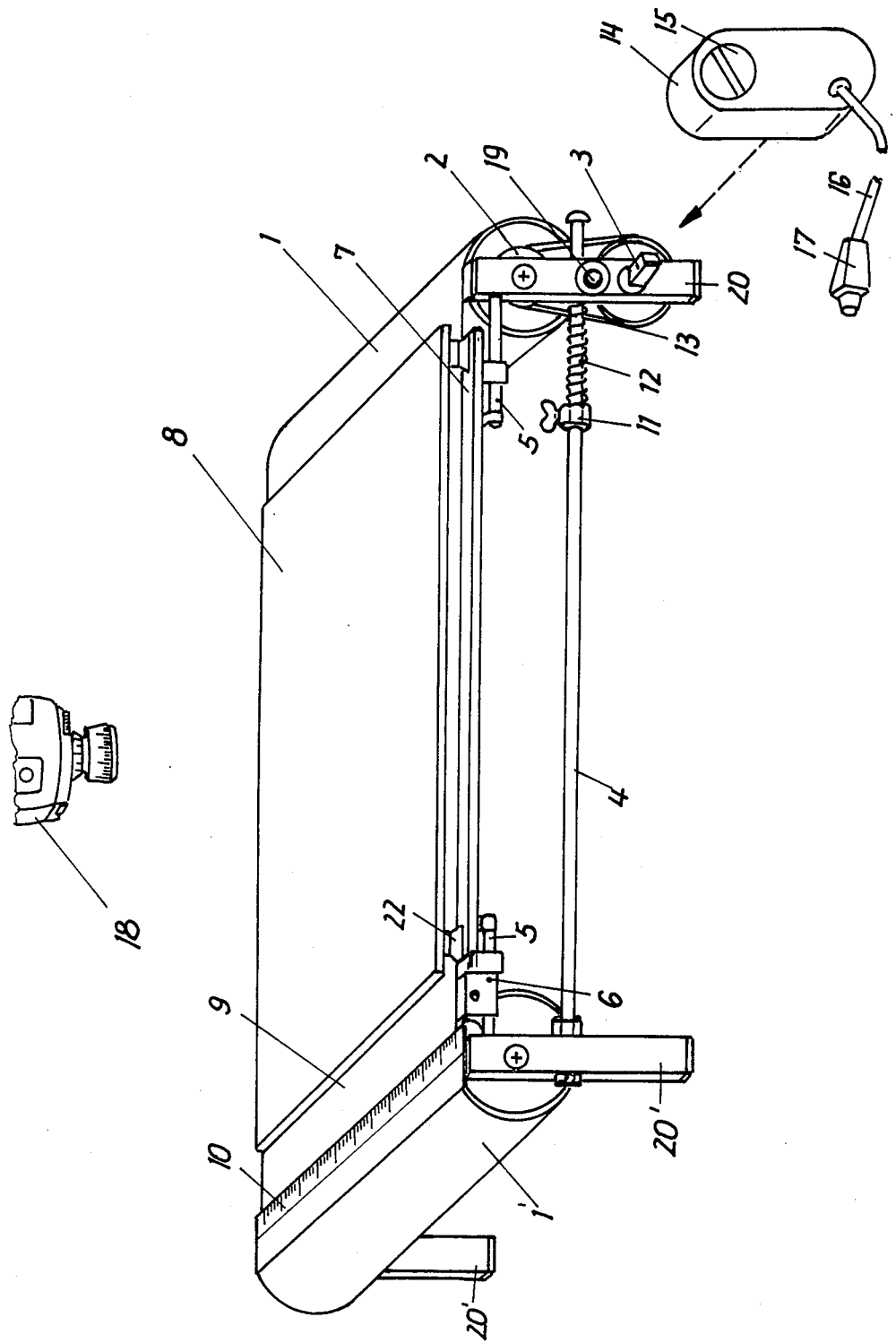

FILM TITLE MACHINE FOR AMATEUR FILMMAKERS

The invention is a machine designed for amateur film makers for producing film titles and comprises of a continuous belt driven by two parallel shaft rollers mounted on two pairs of support legs.

Various film titling machines were designed in the past. While many of these machines have facilitated the production of stationary, horizontally moving and upwardly moving film titles, on the whole, they failed to provided for the superimposition operation and effect. The latter is necessary for making trick titles and producing stage effects.

The purpose of this invention is to further develop the existing design of the film titling machine to enable superimposition. Since the machine is intended for use by amateur film makers, it must remain, in spite of the proposed further development, simple to operate and inexpensive. This problem is solved in the manner specified in the disclosure outlined below.

Photos, placards, travel brochures, art paper calenders, book pages and other items which can be used for the background can be placed on the lower plate.

The continuous belt can be made of transparent plastic upon which the title letters can be placed. When the shaft rollers are rotated the title letters move over and across the background motive which is on the lower plate. The upper plate is a reflection free transparent plate, preferably of glass. If one uses an opaque printed plastic belt instead of the transparent belt, then the background motive can be made to move across the stationary title lying on the upper plate. It is advantageous to use belts for the background made from self adhesive foil which is available everywhere in rolls in hundreds of designs and material imitations. Naturally one does not remove the protective backing of the foil. Instead of having letters on the upper plate, one can have a model or a photograph of a mode of transportation e.g. aeroplane, train, car, ship behind which a country scene, clouds or similar motives can move across so as to give the impression of movement.

Since the plates lie in horizontal planes in most cases it is not necessary to fasten the title, display etc. on the plates. The camera is mounted at all times perpendicularly to and above the plates.

An electric motor which is attached to one of the shaft roller support legs drives one of the shaft rollers through a reduction pulley at a constant speed.

The diagrammatic and perspective drawing shows a preferential design of the titling machine as invented.

The two shaft rollers are indicated on the drawing by 1 and 1' over which a continuous belt is placed. These shaft rollers are supported by the support legs 20 and 20' which are held apart by means of the longitudinally adjustable rods 4. The rods pass axially through the support legs 20 to which they are fastened. With the aid of a locking ring 11 and a coil spring 12 it is possible to tension the belt 9 as required. By loosening the locking ring 11 one can move the support legs towards each other thereby enabling the easy replacement of the belt 9 by sliding same over the shaft rollers. Attached to support leg 20 is a pulley wheel 3 which belt drives another pulley wheel 2 which is keyed to the shaft roller. The electric motor 14 can be attached to the end of the shaft supporting pulley wheel 3. The motor is held in position by the snap fastener 19 attached to support leg 20. 15 is the main switch. After the main switch 15 has been switched to the "on"-position the motor can be switched on and off by means of the control unit 17 which is connected to the motor by cable 16.

Inward pointing support pads 5 which are parallel to the rods 4 are attached to the support legs 20 and 20'. Resting on these support pads 5, which can be pinned in position, is the motive plate 7 which protrudes beyond the sides of the moving belt 9. On the sides of the motive plate 7 which are not covered by the belt 9 stand the distance pieces 22 for the object plate 8. These supports can also be pinned in position on the motive plate 7. The object plate 8 is made of reflection free glass. The camera is mounted perpendicular to and above the horizontally positioned machine.

Attached to the support pads 5 of one of the support leg pairs 20, 20' is a pressure plate 6 for the moving belt 9. The purpose of this pressure plate is to support the belt 9 when letters are being pressed on to it.

Furthermore a scale is attached to one of the support leg pairs 20, 20' to simplify the preparation of titles on the belt.

I claim:

1. A film titling machine, for use by amateur film makers, which comprises:
   a pair of parallel shaft rollers;
   a continuous belt driven and supported by said shaft rollers;
   two pairs of support legs for supporting said shaft rollers;
   longitudinally adjustable rods for holding apart said support legs;
   support pads attached to said support legs, parallel to said rods;
   a motive plate resting on said support pads, said motive plate protruding beyond the sides of said continuous belt;
   distance pieces attached to the sides of said motive plate; and
   an object plate, which is transparent and reflection free, resting on said distance pieces parallel to said motive plate, the upper part of said continuous belt moving between said motive plate and said object plate.

2. The film titling machine of claim 1, wherein said continuous belt is mounted horizontally and a camera is positioned in a direction perpendicular to and above the machine.

3. The film titling machine of claim 1, further comprising an electric motor attached by means of a snap fastener to one of said support legs.

4. The film titling machine of claim 1, wherein said continuous belt is made of self-adhesive foil.

5. The film titling machine of claim 1, wherein said continuous belt is made of transparent plastic foil.

6. The film titling machine of claim 1, wherein each of said longitudinally adjustable rods is fastened to one of said support legs respectively, by means of a locking ring, and a coil spring, while protruding through another opposite and parallel leg of said support legs respectively.

7. The film titling machine of claim 1, further comprising a pressure plate attached to said support pads, said pressure plate for supporting said continuous belt.

8. The film titling machine of claim 1, wherein at least one pair of said support legs is connected by a scale.

* * * * *